United States Patent
Schreiber et al.

(10) Patent No.: US 10,914,360 B2
(45) Date of Patent: Feb. 9, 2021

(54) TOOTHED BELT FOR A MOVABLE ROOF ELEMENT OF A VEHICLE, SYSTEM FOR A VEHICLE ROOF, AND METHOD FOR PRODUCING A TOOTHED BELT FOR A MOVABLE ROOF ELEMENT

(71) Applicant: WEBASTO SE, Stockdorf (DE)

(72) Inventors: Ulrich Schreiber, Stockdorf (DE); Andreas Rockelmann, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 95 days.

(21) Appl. No.: 16/323,432

(22) PCT Filed: Aug. 9, 2017

(86) PCT No.: PCT/EP2017/070189
§ 371 (c)(1),
(2) Date: Feb. 5, 2019

(87) PCT Pub. No.: WO2018/033452
PCT Pub. Date: Feb. 22, 2018

(65) Prior Publication Data
US 2020/0191239 A1  Jun. 18, 2020

(30) Foreign Application Priority Data

Aug. 16, 2016  (DE) .................. 10 2016 115 146

(51) Int. Cl.
| | |
|---|---|
| *F16G 3/00* | (2006.01) |
| *B60J 7/00* | (2006.01) |
| *B60J 7/057* | (2006.01) |
| *F16G 1/28* | (2006.01) |

(52) U.S. Cl.
CPC .............. *F16G 3/00* (2013.01); *B60J 7/0015* (2013.01); *B60J 7/057* (2013.01); *F16G 1/28* (2013.01)

(58) Field of Classification Search
CPC ......... B60J 7/0015; B60J 7/0007; F16G 1/28; F16G 3/00; F16G 3/08; F16G 3/16
USPC ................................................ 296/214, 223
See application file for complete search history.

(56) References Cited

U.S. PATENT DOCUMENTS

| | | | |
|---|---|---|---|
| 4,846,771 A | 7/1989 | Kozachevsky et al. | |
| 5,041,063 A | 8/1991 | Breher et al. | |
| 6,695,135 B1 * | 2/2004 | Lapeyre | B65G 17/08 198/690.2 |

(Continued)

FOREIGN PATENT DOCUMENTS

| | | |
|---|---|---|
| DE | 4414065 C1 | 1/1996 |
| DE | 10157015 A1 | 9/2002 |

(Continued)

OTHER PUBLICATIONS

International Search Report for PCT/EP2017/070189 dated Nov. 16, 2017 and English translation submitted herewith (7 Pages).

*Primary Examiner* — Dennis H Pedder
(74) *Attorney, Agent, or Firm* — Fitch, Even, Tabin & Flannery, LLP (57) ABSTRACT

A toothed belt for a movable roof element of a vehicle which may have a toothed belt body made of plastic, a coupling element, and an interface of the toothed belt, which interface is formed by the coupling element, for coupling to the movable roof element, wherein—the coupling element and the toothed belt body are coupled to each other in a form fitting manner.

11 Claims, 11 Drawing Sheets

(56) References Cited

U.S. PATENT DOCUMENTS

| | | | |
|---|---|---|---|
| 7,360,640 B2* | 4/2008 | Cash, III | B65G 15/42 |
| | | | 198/699 |
| 9,004,146 B2* | 4/2015 | Zeo | B60J 7/0015 |
| | | | 160/370.22 |
| 2002/0060478 A1* | 5/2002 | Maeta | B60J 7/0573 |
| | | | 296/216.04 |
| 2002/0142875 A1* | 10/2002 | Rosenberger | B65G 19/245 |
| | | | 474/237 |
| 2009/0165965 A1 | 7/2009 | Bergmiller et al. | |
| 2013/0186735 A1* | 7/2013 | Umeda | B65G 15/58 |
| | | | 198/890 |
| 2015/0130229 A1 | 5/2015 | Nagashima et al. | |

FOREIGN PATENT DOCUMENTS

| | | |
|---|---|---|
| DE | 102012105375 A1 | 12/2013 |
| EP | 0418542 A2 | 3/1991 |
| EP | 2489900 A1 | 8/2012 |
| EP | 2004430 B1 | 10/2012 |
| EP | 2853424 A1 | 4/2015 |

\* cited by examiner

TOOTHED BELT FOR A MOVABLE ROOF ELEMENT OF A VEHICLE, SYSTEM FOR A VEHICLE ROOF, AND METHOD FOR PRODUCING A TOOTHED BELT FOR A MOVABLE ROOF ELEMENT

The invention relates to a toothed belt for a movable roof element of a vehicle, for example for a cover of an openable roof or for a roller blind. The invention furthermore relates to a system for a vehicle roof with a toothed belt, and to a method for producing a toothed belt for a movable roof element.

CROSS-REFERENCE TO RELATED APPLICATIONS

This application is a U.S. national phase application filed under 35 U.S.C. § 371 of International Application No. PCT/EP2017/070189, filed Aug. 9, 2017, designating the United States, which claims priority from German Patent Application No. 10 2016 115 146.7, filed Aug. 16, 2016, which are hereby incorporated herein by reference in their entirety for all purposes.

BACKGROUND

Field

A roof of a motor vehicle can be designed to be transparent. A roller blind can be arranged in order to reduce the intensity of the solar radiation passing through the transparent roof into the vehicle interior. The vehicle roof can be connected immovably to the body or can have a cover which is movable relative to the rest of the vehicle roof. Said cover can, for example, close a roof opening in a closed position of the cover or, in further positions, can at least partially open up the roof opening. A toothed belt can be provided in order to transmit a movement of a drive to the roller blind and/or to the cover. For example, it is known from DE 10157015 A1 to couple a drive slide to a toothed belt.

Summary

It is desirable to specify a toothed belt for a movable roof element of a vehicle, the toothed belt permitting reliable operation and being cost-effective. It is furthermore desirable to specify a method for producing a toothed belt for a movable roof element of a vehicle, said method making a robust and cost-effective toothed belt possible.

According to one embodiment of the invention, a toothed belt for a movable roof element of a vehicle comprises a toothed belt body made of plastic. The toothed belt body is composed, for example, completely of plastic or for the most part contains plastic and further materials which serve, for example, for reinforcing the toothed belt body. For example, the toothed belt body has a reinforcement. The toothed belt body has, for example, a metal core which is surrounded by the plastic. The toothed belt has a coupling element. The toothed belt has an interface for coupling the toothed belt to the movable roof element. The interface is formed by means of the coupling element. The coupling element and the toothed belt body are coupled to each other in a form-fitting manner. In particular, the toothed belt has a fused connection which connects the coupling element and the toothed belt body to each other.

The toothed belt serves during operation in particular for actuating a roof element which is movable in relation to a vehicle body. The toothed belt transmits a drive force from a drive to the movable roof element. The toothed belt can also be referred to as a drive cable. The toothed belt is formed from a flexible plastic which has a toothing which is in engagement with a drive gearwheel of the drive. The toothed belt is of tension proof and compression proof design. In order to be able to couple the movable roof element to the toothed belt, the interface is provided. In order to ensure the necessary tensile and compressive strength in the region of the interface, the coupling element is provided. The coupling element is a component which is initially formed separately from the toothed belt body and is connected to the toothed belt body in a form-fitting manner. A robust and cost-effective alternative to insert molding is therefore possible. The coupling element can be realized, for example, as a part in ready-from-the-mold form. The geometry of the interface can be configured with a high degree of flexibility. The toothed belt only has to be minimally worked on. For example, the toothed belt body only has to be fused in the region of the interface such that the toothed belt body and the coupling element are connected to each other in a form-fitting manner.

For example, a surface of the coupling element has a structured form. The plastic forms a form fit with the structured form. Alternatively or additionally, the coupling element according to embodiments has a recess. The plastic reaches through the recess from one side of the coupling element to an opposite side of the coupling element. A reliable connection is thus possible between the toothed belt body and the coupling element, said connection permitting transmission of sufficiently high tensile and compressive forces.

According to embodiments, the coupling element is formed from a metal. For example, the coupling element is designed as a sheet-metal punched part.

According to one embodiment, a system for a vehicle roof comprises the movable roof element. The system comprises the toothed belt according to at least one of the embodiments described. The system comprises a drive. The toothed belt is coupled to the drive and to the movable roof element in order to transfer a movement of the drive into a movement of the roof element. The drive is, for example, an electric motor, the rotation of which is transferred by means of the toothed belt into a linear displacement of the movable roof element. The movable roof element is, for example, a roller blind, a roof lining and/or a cover of a sliding roof arrangement.

According to one embodiment, a method for producing a toothed belt for a movable roof element comprises providing a toothed belt body made of plastic. A coupling element is provided. The coupling element and the toothed belt body are positioned on each other. Part of the plastic is fused in a region in which the coupling element and the toothed belt body are positioned in each other. The plastic is remelted in the region in which it is fused such that the plastic reaches behind the coupling element. As a result, a form-fitting coupling of the coupling element and of the toothed belt body is formed.

The plastic is fused, for example, by means of ultrasound or induction. It is also possible to heat the coupling element before the latter is positioned on the toothed belt body. The fused plastic reaches, for example, behind the structured form of the surface of the coupling element or passes through a recess of the coupling element. After the plastic has cooled again and become solid, the form-fitting coupling is formed. The geometry of the region in which the plastic was fused can be configured by the fused plastic, for example a belt tip can be formed.

According to embodiments, the plastic is reshaped in the region in order to form a geometry, which is changed in comparison to the original geometry, from the plastic. It is thereby possible to form an additional functional element on the toothed belt. According to further embodiments, for this purpose additional material is added to melted plastic in order to form the additional functional element. For example, additional plastic is added. The additional functional element is, for example, a guide surface, a toothed belt tip, a spring element, an overrunning portion and/or a further element which is required on the toothed belt.

Further advantages, features and developments emerge from the examples explained below in conjunction with the figures. Identical, similar or identically acting elements can be provided with the same reference signs throughout the figures.

DETAILED DESCRIPTION

Figure 1:
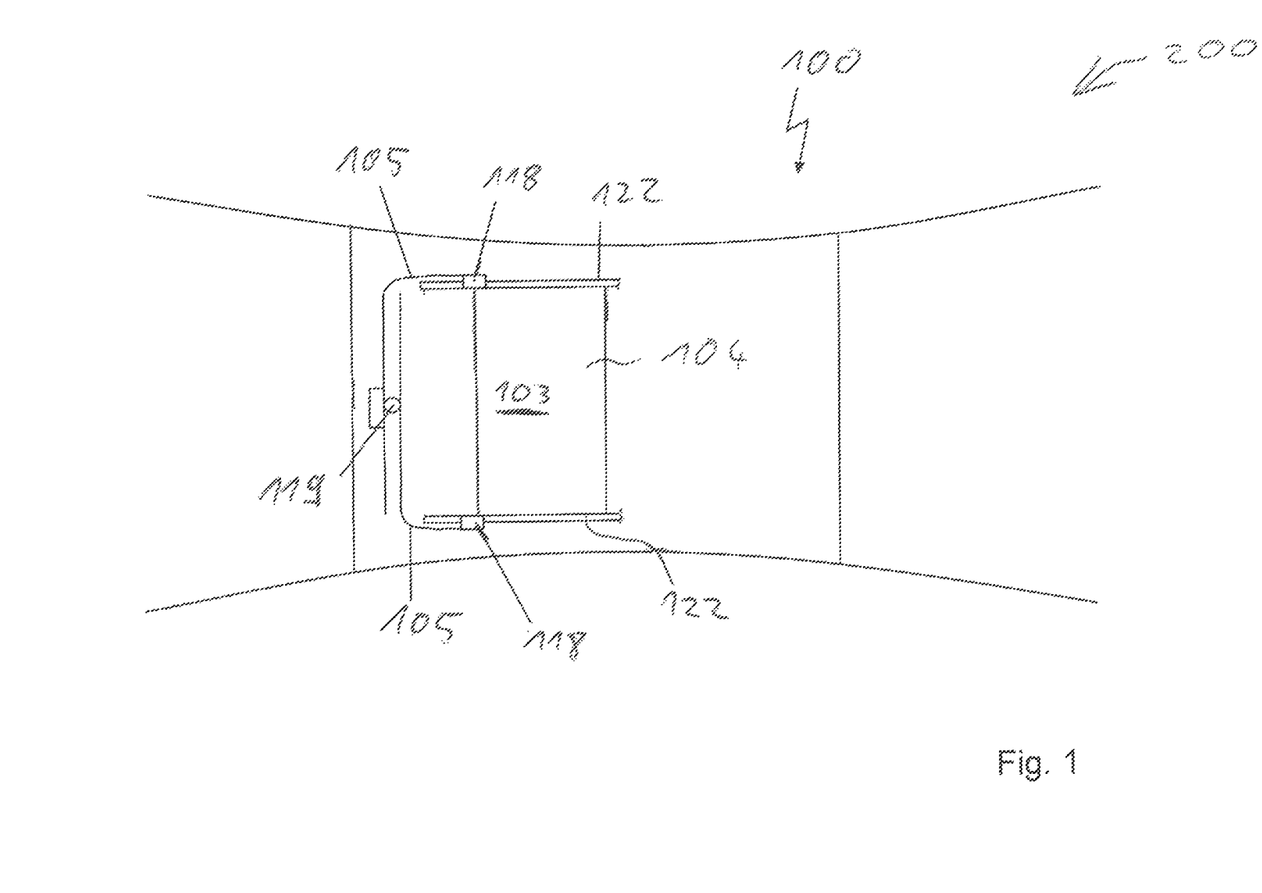
FIG. 1 shows a schematic top view of a vehicle roof according to an exemplary embodiment.

FIG. 1 shows a vehicle roof 100 of a motor vehicle. The vehicle roof 100 is, for example, at least partially transparent such that light can pass from the outside into the interior of the vehicle. The motor vehicle has a system 200. A roller blind 103 which is arranged movably is provided in order to be able to influence the intensity of the incoming light. For example, the roller blind 103 is rolled up on one side and can be unrolled such that the roller blind 103 partially covers the vehicle roof 100 from the inside. The roller blind 103 is therefore an example of a movable roof element 104. According to further embodiments, the movable roof element 104 is, for example, a sliding roof lining which is displaceable relative to the vehicle roof. According to further exemplary embodiments in turn, the roof element 104 is a cover which can optionally close or can at least partially open up a roof opening of the vehicle roof 100.

In order to be able to displace the movable roof element 104, the roller blind 103 in the example illustrated, a drive 119, in particular an electric drive motor, is provided. The drive 119 is coupled to the roller blind 103 with the aid of one or more toothed belts 105 and with the aid of one or more roller blind couplings 118. For example, the toothed belts 105 run in corresponding guide tubes, and the roller blind couplings 118 are arranged on guide rails 122. For example, guide slides which guide the movement of the roller blind 103 are arranged in the guide rails 122.

The toothed belt 105 is in particular a polymer cable which permits low-friction contact with the guide tube. The toothed belt 105 is flexible.

Figure 2:
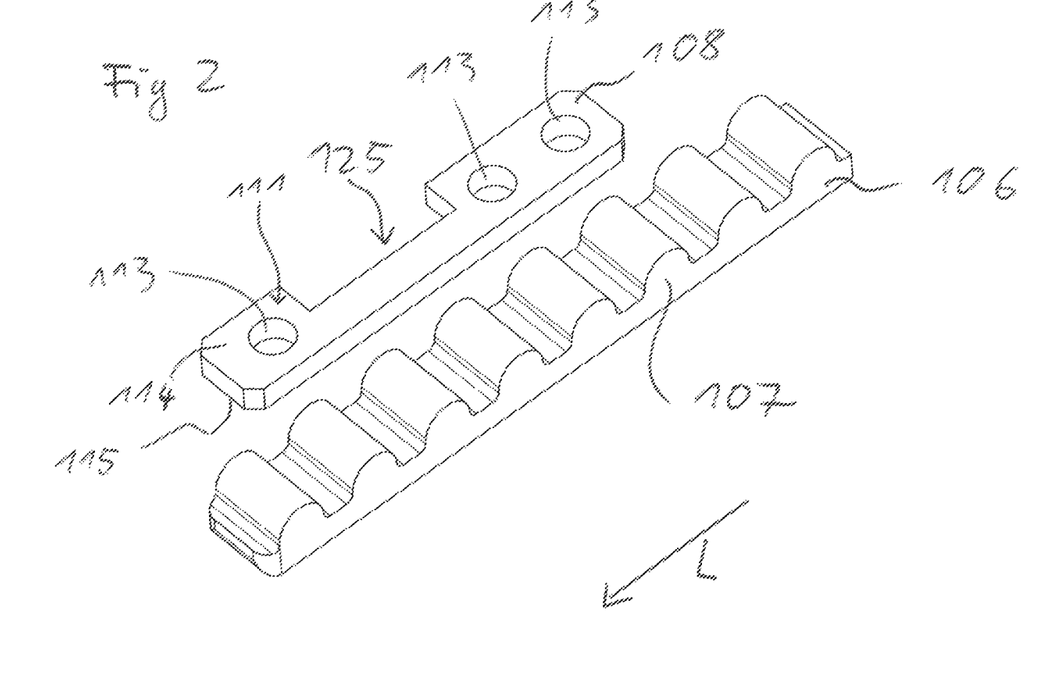
FIG. 2 shows a schematic illustration of a toothed belt body and a coupling element prior to the coupling, according to an exemplary embodiment.

FIG. 2 shows one end of a toothed belt body 106 of the toothed belt 105. The toothed belt body 106 is, for example, an extruded polymer element with a toothing. The toothed belt body 106 is formed from a plastic 107, in particular from a polymer.

A coupling element 108, in particular made of a metal, is provided in order to form an interface 101 (FIG. 3) for the roller blind coupling 118. The coupling element 108 is extended in elongated form along the longitudinal axis L of the toothed belt body 106. Transversely with respect to the longitudinal axis L, the coupling element 108 has an upper side 114 and an opposite lower side 115. In the exemplary embodiment illustrated, the coupling element 108 has three recesses 113 which reach from the lower side 115 to the upper side 114. According to further embodiments, more or fewer than three recesses 113 are provided. In addition, the shape of the recesses is not necessarily round, as in the exemplary embodiment illustrated; the shape may also be formed polygonally or ovally or in some other way.

According to embodiments, a surface 111, preferably the lower side, of the coupling element 108 is structured in order to be able subsequently to enter into a good connection with the plastic 107 of the toothed belt body 106.

In addition, the coupling element 108 has a set-back region 125 transversely with respect to the longitudinal direction L.

Figure 3:
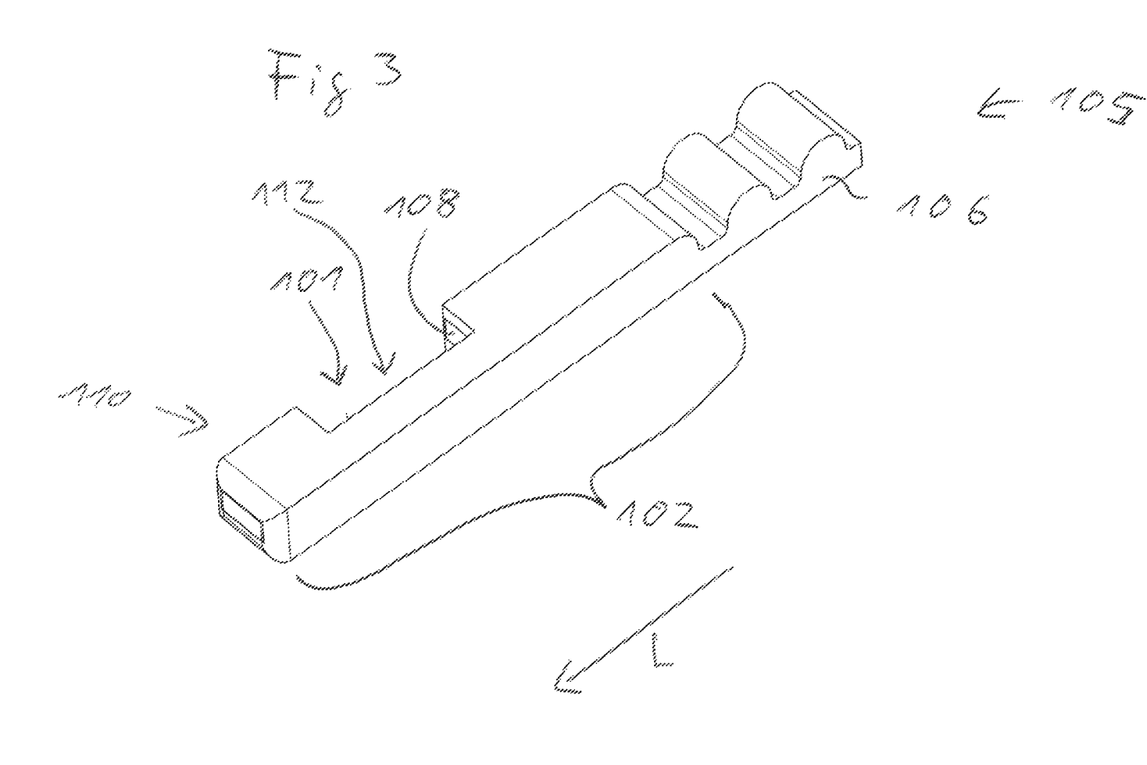
FIG. 3 shows a schematic illustration of a toothed belt according to an exemplary embodiment.

FIG. 3 shows the end of the toothed belt 105 from FIG. 2 after the coupling element 108 has been connected to the toothed belt body 106. The plastic 107 of the toothed belt body 106 has been fused in a region 102 in which the coupling element 108 is arranged, and therefore the plastic 107 now surrounds the coupling element 108. A form fit is therefore formed between the toothed belt body 106 and the coupling element 106. A fused connection 110 is formed in order to connect the coupling element 108 to the toothed belt body 106. The toothed belt 105 has an interface 101 in the region 102 for coupling to the movable roof element 104. In the exemplary embodiment illustrated, the interface 101 is formed by a set-back region 112 which corresponds to the set-back region 125 of the coupling element 108.

The plastic 107 penetrates, for example, the recesses 113. Alternatively or additionally, the plastic 107 enters the structured form of the surface 111. The form-fitting connection between the toothed belt body 106 and the coupling element 108 is therefore formed.

Figure 4:
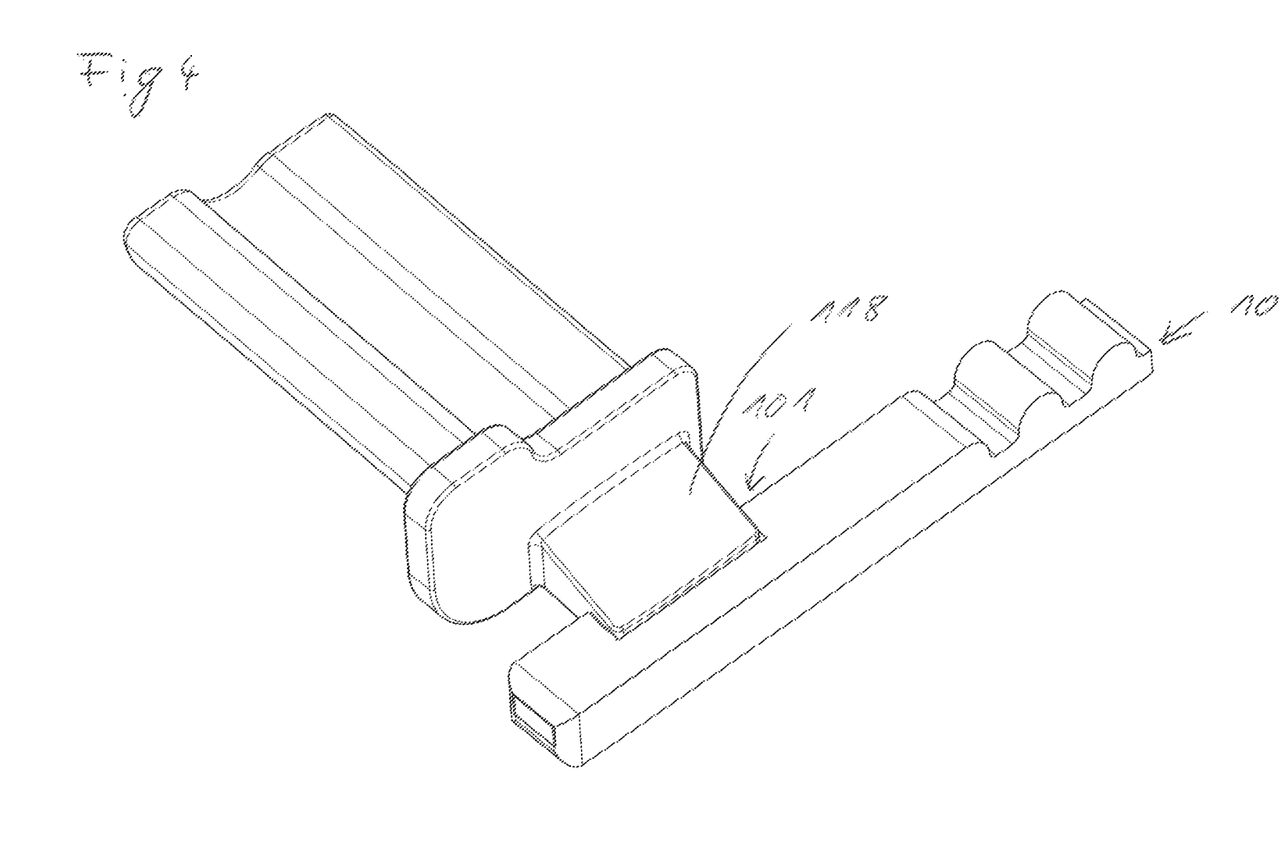
FIG. 4 shows a schematic illustration of the toothed belt and a roller blind coupling according to an exemplary embodiment.

FIG. 4 shows the toothed belt 105 which is coupled to the roller blind coupling 118 by means of the interface 101. The interface 101 forms a universally usable interface and can be used on different couplings for different roof elements 104. By means of the toothed belt 105 with the coupling element 108 and the interface 101, it is possible to use the toothed belt 105 made of plastic with already existing conventional roller blind couplings 118.

In the exemplary embodiment shown, the interface 101 is arranged at the end of the toothed belt 105. Alternatively or additionally, it is also possible to arrange the interface 101 on the toothed belt body 106 centrally along the longitudinal axis L.

An exemplary embodiment of a method for producing the toothed belt 105 is described below with reference to FIGS. 5 to 10.

Figure 5:
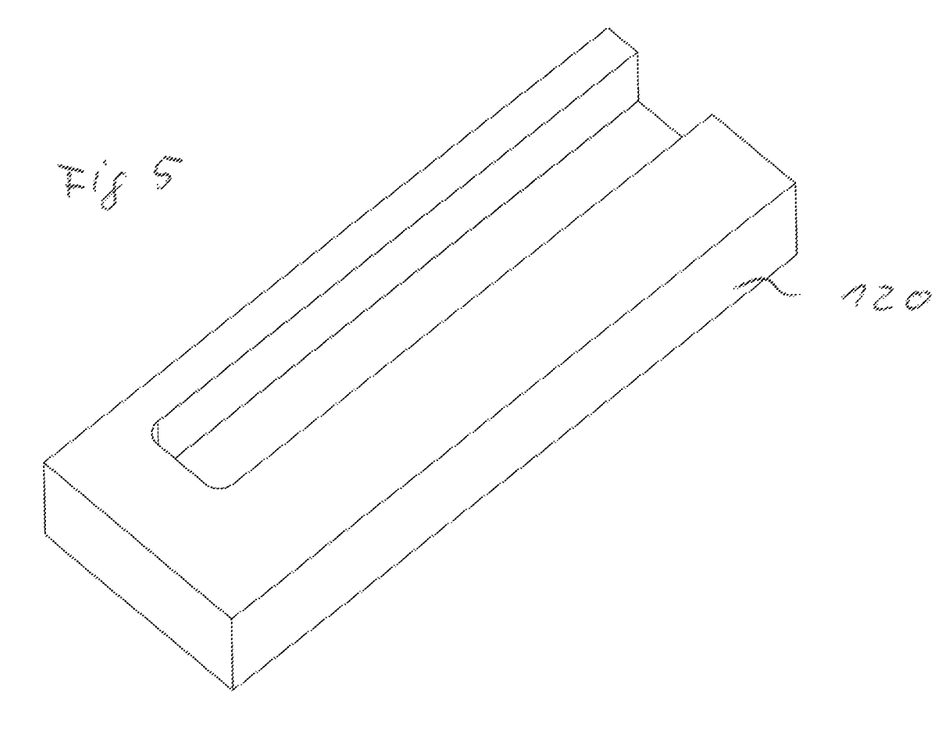
FIG. 5 shows a schematic illustration of a lower part of a mold according to an exemplary embodiment.

FIG. 5 shows a lower part 120 of a mold for connecting the toothed belt body 106 to the coupling element 108.

Figure 6:
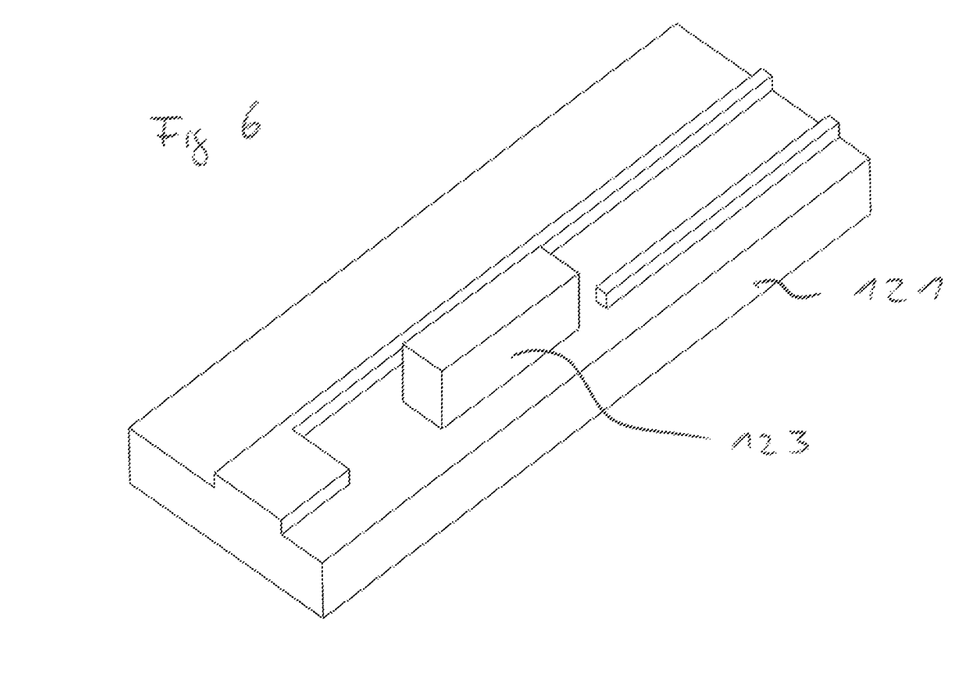
FIG. 6 shows a schematic illustration of an upper part of a mold according to an exemplary embodiment.

FIG. 6 shows a corresponding upper part 121 of the mold with a projection 123. The projection 123 corresponds to the set-back region 112 of the interface 101.

Figure 7:
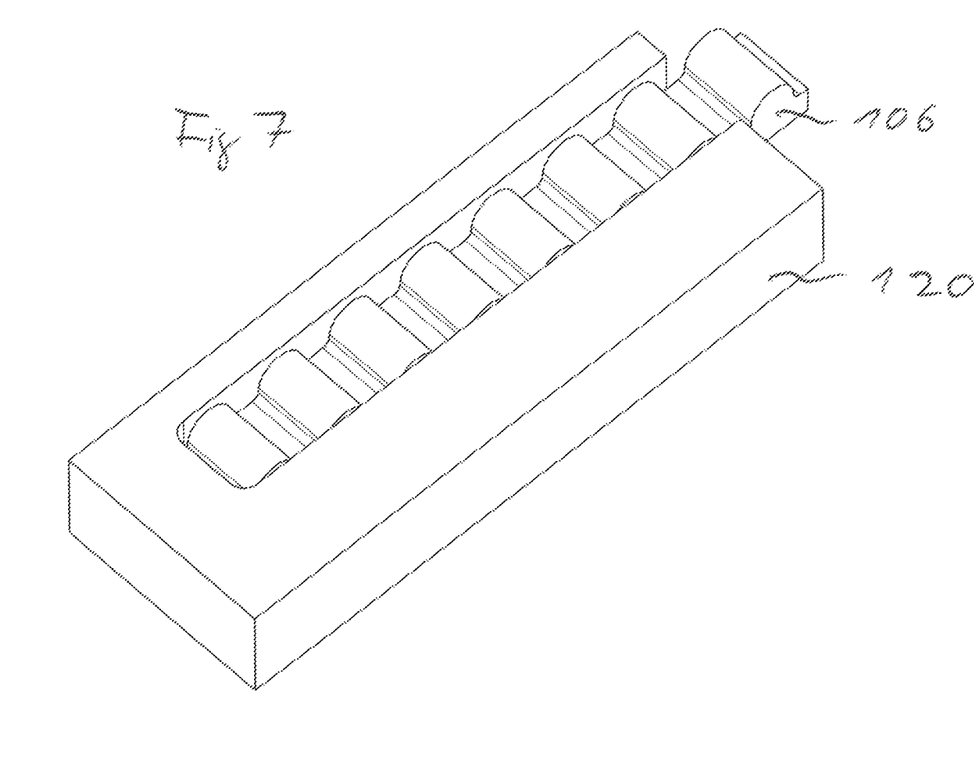
FIGS. 7 to 10 show various method stages during the production of the toothed belt according to an exemplary embodiment.

First of all, the toothed belt body 106 containing the plastic 107 is placed into the lower part 120, as illustrated in FIG. 7.

Figure 8:
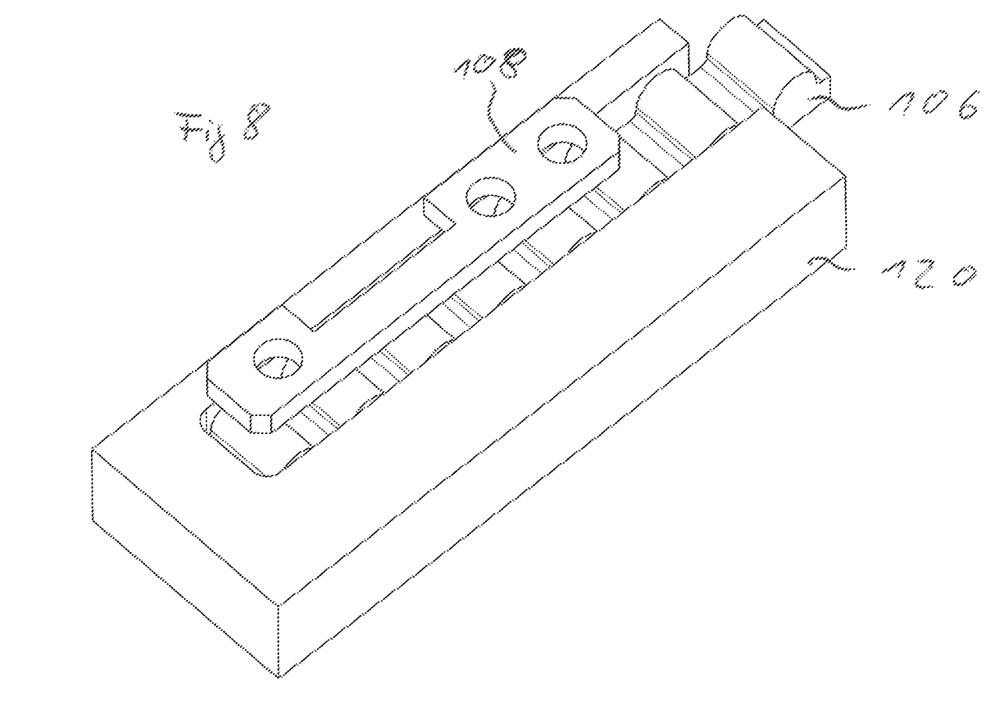
Figure 9:
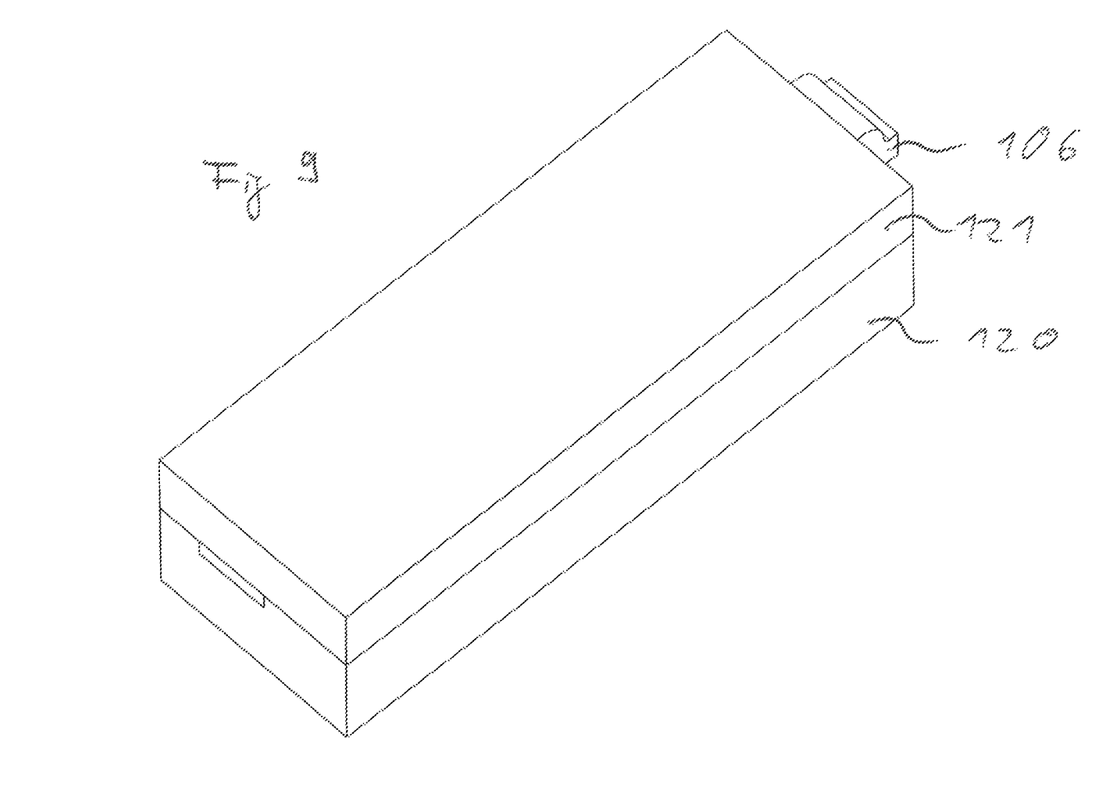

FIG. 8 shows the provision of the coupling element 108. The coupling element 108 is likewise placed into the lower part 120 onto the toothed belt body 106. The upper part 121 is subsequently applied.

The toothed belt body 106 is fused in the region of the coupling element 108. The plastic 107 is fused, for example, by means of ultrasound and/or induction. Welding for melting the plastic 107 is also possible. For example, additional plastic is supplied. It is also possible to heat the coupling element 108 before the latter, as shown in FIG. 8, is placed into the mold with the lower part 120. The preheated coupling element 108 then fuses the plastic 107 in the mold.

Figure 10:
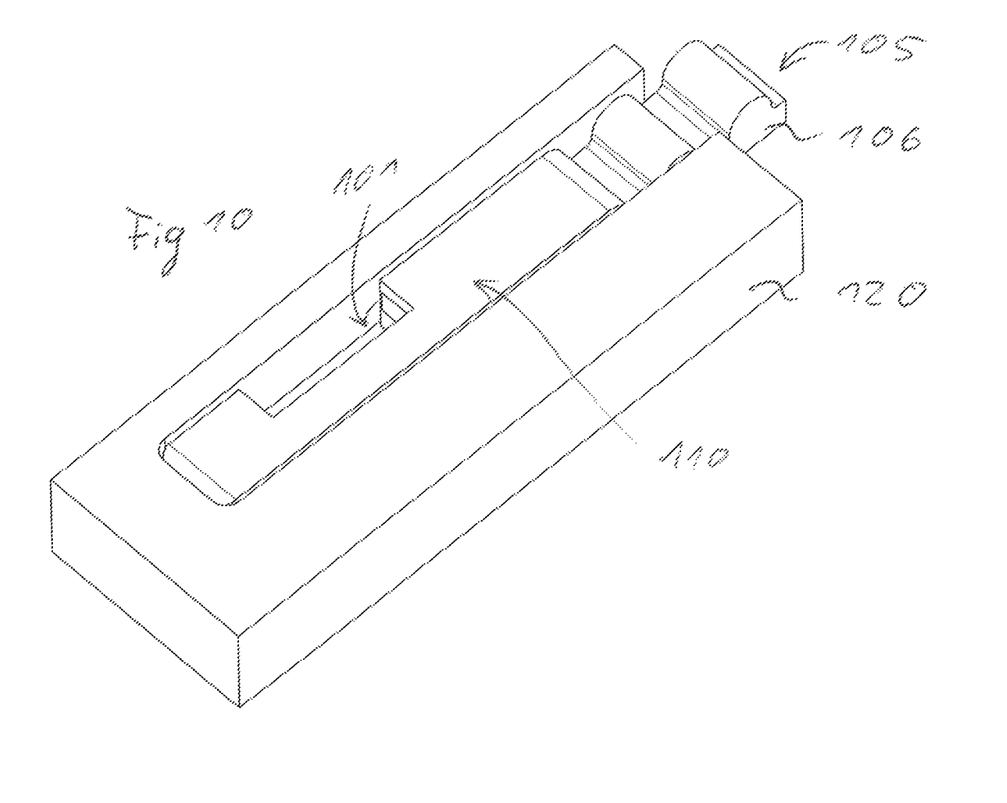

The shape of the toothed belt 105 in the region 102, in particular the shape of the interface 101, is predetermined by the shape of the lower part 120 and the shape of the upper part 121. Therefore, for example, the interface 101 can be formed with the set-back region 112, as illustrated in FIG. 10.

Figure 11:
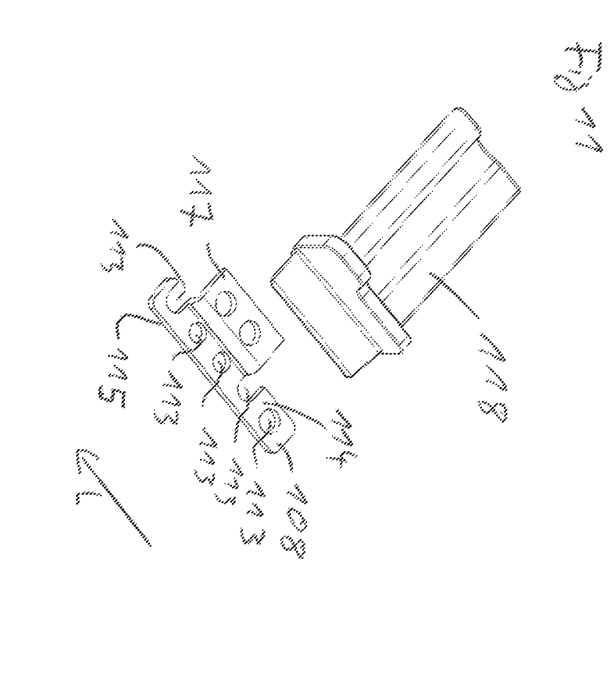
FIG. 11 shows a schematic illustration of the coupling element according to a further exemplary embodiment.
Figure 12:
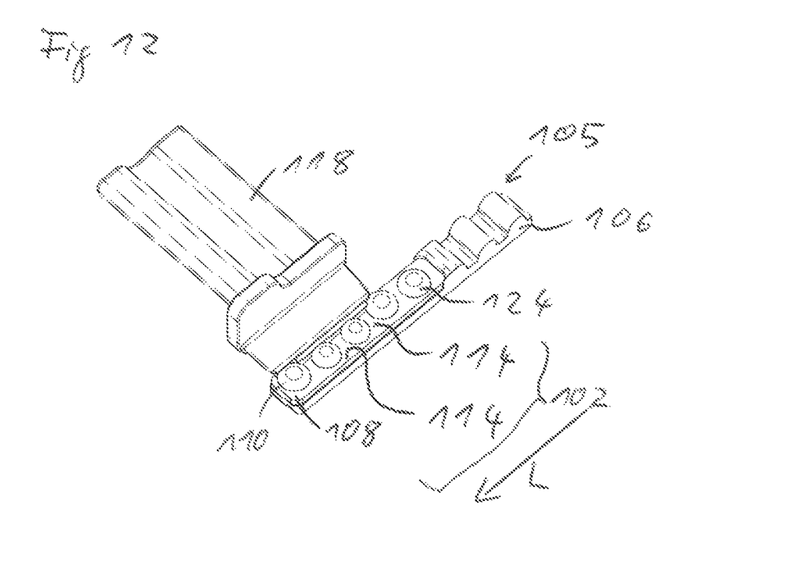
FIG. 12 shows a toothed belt according to the further exemplary embodiment.

FIGS. 11 and 12 show a further exemplary embodiment of the coupling element 108 and of the form-fitting connection to the toothed belt body 106.

As illustrated in FIG. 11, the coupling element 108 substantially corresponds to the coupling element as described in the previous figures. Instead of the set-back region 125, the coupling element 108 according to the exemplary embodiment of FIGS. 11 and 12 has a projecting region 117. In the operationally ready state, said region projects over the toothed belt body 106 transversely with respect to the longitudinal axis L.

FIG. 12 shows the coupling element 108 connected to the toothed belt body 106 and the roller blind coupling 118. The roller blind coupling 118 is coupled to the projecting region 117. The plastic 107 of the toothed belt body 106 penetrates the recesses 113 from the lower side 115 to the upper side 114 of the coupling element 108. Rear-engaging elements 124 are formed on the upper side 114.

In the exemplary embodiment of FIGS. 2 to 10, the coupling element 108 is in each case completely covered by the plastic 107 at least on the upper side 114 and on the lower side 115. By contrast thereto, the coupling element 108 in the exemplary embodiment of FIGS. 11 and 12 is only partially covered with the plastic 107 on the upper side 114. Combinations of the exemplary embodiments are also possible, for example an interface 101 with a set-back region 112, as illustrated in FIG. 3, and with a fused connection 110, as illustrated in FIG. 12, which only partially covers the side 114.

According to the application, the coupling element is fused onto the toothed belt body 106, which is formed from a thermoplastic, or is welded to the toothed belt body 106. It is thereby possible to provide the toothed belt body 106 cost-effectively as a product sold by the meter. In a separate step, the toothed belt body 106 is manufactured and the coupling element 108 applied.

The coupling element 108 is, for example, a sheet-metal punched part with the cutouts 113 and/or the structured form or with contours on the surface 111 for connection to the toothed belt body 106. The coupling element 108 is pressed onto the toothed belt body 106 and fused therewith. A form fit with respect to the toothed belt body is formed by the fused or the welded plastics material 107 of the toothed belt body 106. For this purpose, the recesses 113 and/or the structured surface 111 are/is provided. Contact with the guide rail 112 of the coupling element 108 is prevented by the fused plastics material 107 of the toothed belt body 106.

The elongate extension of the coupling element 108 ensures good transmission of force, in particular in respect of the pulling-off resistance, and good support in the guide rail 122. Sufficiently good guidance and centering of the coupling element 108 in the joining mold with the lower part 120 and the upper part 121 is possible for sufficient repetition accuracy. An impermissible cross-sectional change due to the melting process can be reduced by means of corresponding cavities in the mold. In addition, it is possible to form the tip of the toothed belt 105 by means of a corresponding configuration of the mold.

Various embodiments of the coupling element 108 are possible. For example, the coupling element 108 is designed as a punched part. According to further exemplary embodiments, the coupling element 108 is designed as a part which is insert molded with plastic and has a metal insert. According to further embodiments, the coupling element 108 is designed as a punched part with a plastics part which is connected by means of a snap connection or plug-in connection and, for example, is likewise fused therewith.

A robust and cost-effective alternative to insert molding the coupling element 108 is therefore made possible. The toothed belt body 106 can be provided as a product sold by the meter, in particular by different suppliers. The coupling element can be provided as a part in ready-from-the-mold form. The geometry of the interface 101 can be configured with a high degree of flexibility. The toothed belt body 106 only has to be minimally worked on. Lateral punched portions can be omitted. Relatively large tension members can thereby be integrated in the toothed belt body 106. A higher tensile and compressive strength can therefore be realized.

Various forms of the form-fitting connection between the toothed belt body 106 and the coupling element 108 are possible. In addition to what has been described, for example lateral embracing is also possible, in which the plastic 107 at the edge of the coupling element 108 passes from the lower side 115 to the upper side 114.

The invention claimed is:

1. A toothed belt for a movable roof element of a vehicle, comprising:
    a toothed belt body made of plastic,
    a coupling element, and
    an interface of the toothed belt, which interface is formed by a set-back region of the coupling element, for coupling to the movable roof element, wherein the coupling element and the toothed belt body are coupled to each other in a form fitting manner, and
    in which the coupling element has a recess, and the plastic reaches through the recess from one side of the coupling element to an opposite side of the coupling element.

2. The toothed belt according to claim 1, comprising a fused connection which connects the coupling element and the toothed belt body to each other.

3. The toothed belt according to claim 1, in which a surface of the coupling element has a structured form, and the plastic forms a form fit with the structured form.

4. The toothed belt according to claim 1, in which the interface has a region set back transversely with respect to the longitudinal axis of the toothed belt.

5. The toothed belt according to claim 1, in which the coupling element has a region projecting transversely with respect to the longitudinal axis of the toothed belt body.

6. A toothed belt for a movable roof element of a vehicle, comprising:
   a toothed belt body made of plastic,
   a coupling element, and
   an interface of the toothed belt, which interface is formed by a set-back region of the coupling element, for coupling to the movable roof element, wherein the coupling element and the toothed belt body are coupled to each other in a form fitting manner, and
   in which the coupling element is completely covered by the plastic at least on two opposite sides.

7. The toothed belt according to claim 1, in which the coupling element is metal.

8. The toothed belt according to claim 1, in which the interface is configured for coupling to a roller blind coupling of a roller blind.

9. A system for a vehicle roof, comprising: a movable roof element, a toothed belt according to claim 1, a drive, wherein the toothed belt is coupled to the drive and to the movable roof element to transfer a movement of the drive into a movement of the roof element.

10. A method for producing a toothed belt for a movable roof element of a vehicle, comprising:
    providing a toothed belt body made of plastic,
    providing a coupling element with a recess, wherein the plastic reaches through the recess from one side of the coupling element to an opposite side of the coupling element,
    positioning the coupling element and the toothed belt body on each other,
    fusing part of the plastic in a region in which the coupling element and the toothed belt body are positioned on each other, and
    reshaping the plastic in the region such that the plastic forms a form fitting coupling of the coupling element and the toothed belt body.

11. A method for producing a toothed belt for a movable roof element of a vehicle, comprising:
    providing a toothed belt body made of plastic,
    providing a coupling element which is completely covered by the plastic at least on two opposite sides,
    positioning the coupling element and the toothed belt body on each other,
    fusing part of the plastic in a region in which the coupling element and the toothed belt body are positioned on each other, and
    reshaping the plastic in the region such that the plastic forms a form fitting coupling of the coupling element and the toothed belt body.

\* \* \* \* \*